D. Gore.
Hedge Plasher.
N° 91620. Patented Jan. 22, 1869.
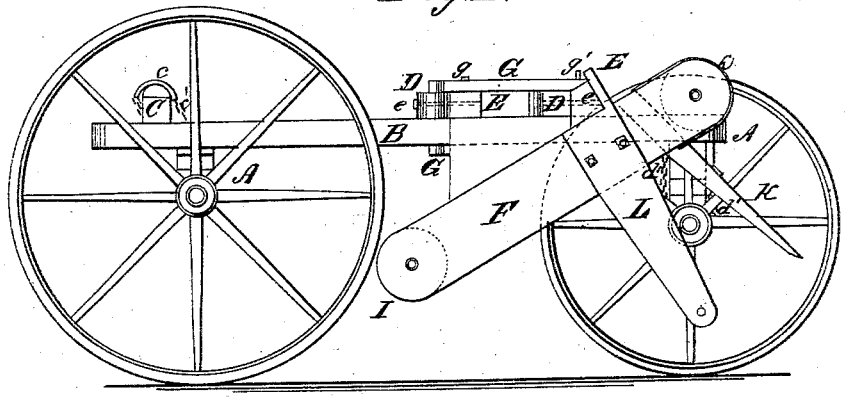
Fig. 1.
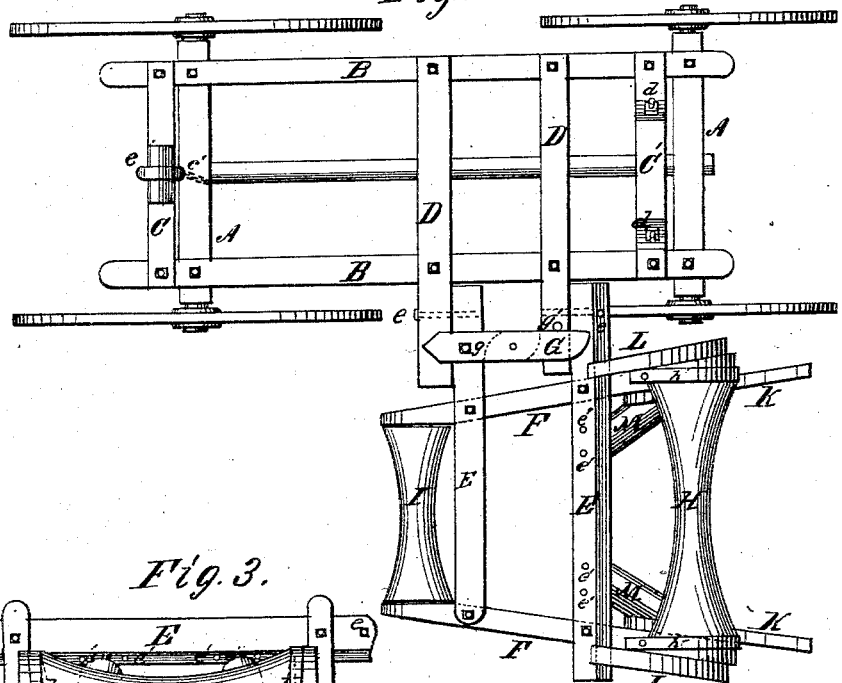
Fig. 2.
Fig. 3.
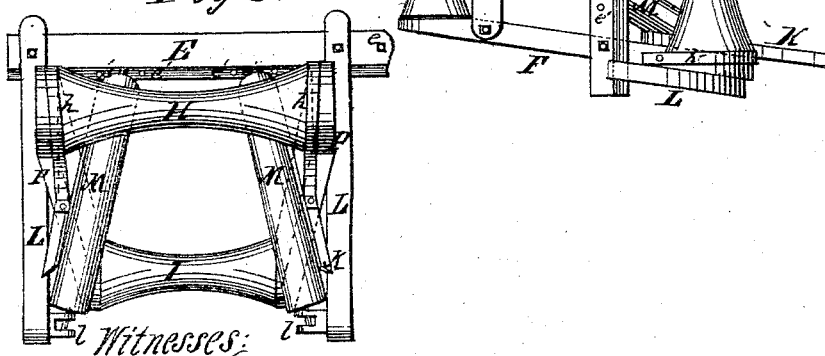
Witnesses:
William W. Herthel
Robert Burns
Inventor:
David Gore by his
atty
Herthel & Co.

UNITED STATES PATENT OFFICE.

DAVID GORE, OF CARLINVILLE, ILLINOIS.

IMPROVEMENT IN MACHINE FOR PLASHING HEDGES.

Specification forming part of Letters Patent No. 91,620, dated June 22, 1869.

*To all whom it may concern:*

Be it known that I, DAVID GORE, of Carlinville, in the county of Macoupin and State of Illinois, have made certain new and useful Improvements in Machines for Plashing Hedges and similar purposes; and I do hereby declare the following to be a full and true description thereof, reference being had to the accompanying drawings, and to the letters of reference marked thereon.

This invention relates to machines for bending down, binding, and interweaving the branches and stalks of hedge-plants, so as to form a more coherent and solid growth. In the usual modes of plashing, after the hedge-plants have been cut, the operator bends the stalks by hand and interlocks the branches. By the operation of my said machines the work aforesaid is accomplished in an improved manner, and in less time than hitherto.

To accomplish the said object, the nature of this invention is in the application of two or more rollers, placed at unequal heights from the ground, which are moved over the hedge-growth to depress the same; and, secondly, in connection therewith, of a number of inclined lateral rollers, which compress and laterally deflect the hedge-plants.

For the convenience of use, I arrange my said plashing-machine upon an ordinary wagon-frame, and as said machine projects laterally from the wagon-frame, I connect the frame of the plasher in a hinged manner with the wagon-frame, so that said plasher may be raised up and laid over upon the wagon-frame, thus avoiding undue width, which would prevent the said machine from passing ordinary farm-gates.

To enable those herein skilled to make and use my said machine, I will now more fully describe the same, referring to the accompanying Figure 1 as a side elevation, to Fig. 2 as plan, and to Fig. 3 as a front view of the plasher detached from the wagon.

As was before stated, I prefer to arrange my said plasher upon an ordinary wagon-frame, A, and in order to properly support the plasher on said frame, I arrange the longitudinal timbers B upon said frame A, securing the said timbers by bolts or by chains. As the plasher-frame projects laterally and acts to overturn the frame A, I arrange the transverse timbers C C' upon the timbers B, connected to the same by proper bolts. I connect said timbers C with the wagon-axle by the curved link $c$ and chain $c'$, and to make the connection firm a key is driven under said link $c$.

The forward timber, C, is arranged with hook-bolts $d$, upon which the chain $d'$ is hung, passing under the wagon pole or tongue. By drawing up the nuts upon the bolts $d$ their connection is made secure.

Upon the timbers B, and passing between the wheels of the wagon, I secure by bolts the plasher-supporting beams D. To these are connected the extension-beams E by the hinge-bolts $e$. Said beams E support the plasher-frame F, which is hung thereto.

In order that the plasher-frame F may be turned back to rest upon the wagon A, the beams E are pivoted at the bolt $e$, as aforesaid, and to give a proper support to the plasher a locking-bar, G, is arranged forking about the beams E and D. A stay-bolt, $g$, and pin $g'$ (or either thereof) hold said bar G in its position, keeping the beams E and D in line; but on releasing the bolt $g$ and withdrawing the pin $g'$, the bar G being turned about the bolt $g$ until its ends shall no longer lap upon the beams E, then the beams E and D are connected solely by said hinge-bolts $e$, and the plasher may be raised up and laid upon the frame A.

The plasher-frame F is inclined at an angle of about thirty (30) degrees to the horizon. Said frame has at its front (or higher) end the roller H, and at its rear (or lower) end the roller I. Said rollers turn freely upon proper journals, and diminish in diameter toward the center, thus acting to crowd the plants over which they pass toward the middle of the plasher-frame. A strap, $h$, is arranged to conceal the ends of the roller H, and thus prevent the hedge-plants from becoming entangled between the roller and its frame. Said strap $h$ passes down to be secured upon the guide-prongs K, which are connected to the frame F, and project forward, so as to guide the hedge-growth toward the inner part of the plasher.

At the sides of the frame F, I further secure the supports L, which hold the lower bearings $l$ for the lateral rollers M, the upper ends of said rollers being held in the timber E. Said rollers M are cylindrical, and turn freely about their journals, in order that they may be placed at any proper angle of inclination.

A series of holes, $e'$, will be made in the beam E, into either of which the journal-shafts of said rollers may be placed.

In the application of my said machine, the hedge-growth is passed between the prongs K as the wagon is drawn forward, and the rollers H deflect the plants, while the lateral rollers M press the same toward the middle of the hedge, until the last roller, I, gives to the plants a permanent deflection, thus leaving the stalks at an angle of about thirty (30) degrees with the ground, firmly interwoven and formed into a solid and coherent mass.

Having thus fully described my said invention, what I claim is—

1. The arrangement and use of two or more rollers placed at different heights, and connected to a proper frame, which is moved over the hedge for depressing and interweaving the plants, substantially as herein set forth.

2. The arrangement and use of two or more inclined lateral rollers to laterally compress the hedge, operating in the plasher-frame, substantially as set forth.

3. The guide-prong K, roller H, rollers M, and roller I, combined and operating in the frame F, substantially as and for the purpose set forth.

4. The frame F, connected to the timbers E, and hinged to the timbers D, to allow the plasher-frame to be turned back and rest upon the wagon-frame, substantially as set forth.

In testimony whereof I have hereunto set my hand.

DAVID GORE.

Witnesses:
NICHS. DUBOIS,
JOHN T. ROGERS.